United States Patent [19]

Monroe

[11] Patent Number: 5,585,967
[45] Date of Patent: Dec. 17, 1996

[54] THREE DIMENSIONAL VIRTUAL IMAGE SYSTEM

[75] Inventor: Marshall M. Monroe, Glendale, Calif.

[73] Assignee: The Walt Disney Company, Burbank, Calif.

[21] Appl. No.: 118,384

[22] Filed: Sep. 7, 1993

[51] Int. Cl.⁶ .................. G02B 27/14; G03B 21/32; G03B 21/26; G03B 21/28
[52] U.S. Cl. ................... 359/629; 359/636; 359/630; 359/633; 352/86; 353/94; 353/98; 353/99
[58] Field of Search ................ 352/69, 70, 57, 352/86; 353/94, 98, 99, 6, 7, 10; 354/112, 113, 117; 359/462, 464, 466, 471, 629, 633, 634, 636, 618, 630

[56] References Cited

U.S. PATENT DOCUMENTS

| | | | |
|---|---|---|---|
| 4,084,194 | 4/1978 | Hector | 358/254 |
| 4,129,365 | 12/1978 | Aversno | 353/99 |
| 4,189,145 | 2/1980 | Stubben et al. | 273/313 |
| 4,232,968 | 11/1980 | Kempf | 356/393 |
| 4,306,768 | 12/1981 | Egging | 350/174 |
| 4,378,955 | 4/1983 | Bleha, Jr. et al. | 350/334 |
| 4,403,216 | 9/1983 | Yokoi | 340/705 |
| 4,535,394 | 8/1985 | Dugre | 362/231 |
| 4,568,080 | 2/1986 | Yokoi | 273/1 |
| 4,589,659 | 5/1986 | Yokoi et al. | 273/1 |
| 4,641,918 | 2/1987 | Moffatt | 352/69 |
| 4,799,765 | 11/1989 | Ferrer | 350/174 |
| 4,879,603 | 11/1989 | Berman | 358/242 |
| 4,900,133 | 2/1990 | Berman | 350/346 |
| 4,971,312 | 11/1990 | Weinreich | 272/8 |
| 4,973,951 | 11/1990 | Shigeta et al. | 340/717 |
| 4,987,410 | 1/1991 | Berman et al. | 340/705 |
| 4,991,955 | 2/1991 | Vetter | 352/69 |
| 4,995,718 | 2/1991 | Jachimowicz | 353/31 |
| 5,190,286 | 3/1993 | Watanabe et al. | 273/85 |
| 5,191,450 | 3/1993 | Yajima | 359/54 |
| 5,221,083 | 6/1993 | Dote | 273/85 |
| 5,264,881 | 11/1993 | Brooke | 353/94 |
| 5,300,942 | 4/1994 | Dolgoff | 345/32 |
| 5,467,154 | 11/1995 | Gale | 353/119 |

OTHER PUBLICATIONS

Scientific American, vol. 254, Jun. 1986, Jearl Walker, "The Amateur Scientist; Mirrors Make a Maze So Bewildering That The Explorer Must Rely On A Map," pp. 120–126.

*Primary Examiner*—Georgia Y. Epps
*Assistant Examiner*—Ricky Mack
*Attorney, Agent, or Firm*—Hecker & Harriman

[57] ABSTRACT

A method and apparatus for display of a three dimensional virtual image is provided. The present invention allows one or more objects, real images and virtual images to be displayed at one or more of an arbitrary number of depth levels along a viewer's line of sight. The present invention uses a plurality of beam splitters organized as an optical labyrinth to combine a images with the proper perspective and parallax to result in a three dimensional image.

28 Claims, 6 Drawing Sheets

THREE DIMENSIONAL VIRTUAL IMAGE SYSTEM

BACKGROUND OF THE INVENTION

1. Field of the Invention

The present invention relates to virtual image systems.

2. Background Art

It is difficult to display three dimensional images on most present display devices. Images may be displayed on a two dimensional display device such as a CRT, and the images may be displayed in perspective so as to give the appearance of three dimensions. However, the image size must be adjusted to provide perspective. Portions of an image intended to appear more distant must be reduced in size relative to portions intended to appear closer. While two dimensional images in perspective may have the correct proportions to simulate three dimensional images, they do not provide parallax. Without the proper parallax, a viewer can easily distinguish a two dimensional image in perspective from a true three dimensional image.

Other approaches have been used to provide parallax as well as proportion. Mirror mazes or labyrinths have been constructed to provide the illusion of hallways, rooms and other objects in locations where they did not actually exist. An article entitled "The Amateur Scientist; Mirrors Make a Maze So Bewildering That the Explorer Must Rely on a Map" by Jearl Walker on pages 120–126 of *Scientific American,* volume 254 (June 1986) discloses a number of mirror labyrinths and method for designing and analyzing mirror labyrinths. The mirror labyrinths are constructed using mirrors aligned along the edges of equilateral triangles. Thus, the mirrors meet each other at angles that are multiples of 60°. The mirrors produce regularly repeated images around the borders of a "hallway" when viewed from the proper location and direction. The image that appears at the distant end of a "hallway" can be controlled. However, traditional mirror labyrinths do not provide for images having some degree of transparency to be interposed between the viewer and the distant end of a "hallway" such that objects at the distant end of the hallway can still be seen through the interposed images. Furthermore, traditional mirror labyrinths do not allow images to pass through mirrors and do not provide images originating behind exterior mirrors to be seen within the labyrinth.

Other approaches have been used to simulate stereo vision, where each eye sees a different image so as to provide a three dimensional effect. One prior art method of providing stereo vision involved a viewer with spectrally filtered eyeglasses viewing an image having spectrally encoded stereo information. For this approach, the viewer wears eyeglasses that typically have a red lens over one eye and a green or blue lens over the opposite eye. The viewer views an image that includes a left component and a right component. The left component is of the color of the lens covering the left eye, while the right component is of the color of the lens covering the right eye. The left component provides the left eye with a view representative of what the left eye would see if the image were three dimensional. The right component provides the right eye with a view representative of what the right eye would see if the image were three dimensional. The views seen by the right and left eyes are mentally combined to form a three dimensional perception of the image. However, since colors are used to encode stereo vision information, the colors of the image must be carefully controlled, and the image cannot be naturally colored. Thus, while the images may appear three dimensional, they are unnaturally colored. Furthermore, the three dimensional effect is lost unless the viewer wears the filtering eyeglasses.

Another approach involves the viewer wearing orthogonally oriented polarizing filters over each eye. An image having stereo vision information encoded with orthogonal polarization is viewed by the viewer. Stereo vision information relevant to the left eye is encoded with a polarization matching the polarization of the lens over the left eye, while stereo vision information relevant to the right eye is encoded with a polarization matching the polarization of the lens over the right eye. Thus, the left and right eyes receive their respective stereo vision information, which is mentally combined to form a three dimensional perception. However, the three dimensional effect is lost unless the viewer wears cross polarized eyeglasses.

Another approach involves a viewer wearing (liquid crystal display) LCD shuttered eyeglasses and viewing an image that alternates between a left component and a right component while the LCD shutters alternate between blocking vision of the right eye and left eye, respectively. The eyeglasses contain individually controllable LCD shutters over the left eye and over the right eye. The eyeglasses are used to view a display device, such as a cathode ray tube (CRT) that can rapidly change the image it is displaying. When the display device displays a left component of stereo vision information, the LCD shutter over the left eye is opened and the LCD shutter over the right eye is closed. When the display device displays a right component of stereo vision information, the LCD shutter over the right eye is opened and the LCD shutter over the left eye is closed. Thus, the left and right eyes receive their respective left and right components of stereo vision information. The left and right components of stereo vision information are combined mentally to form a three dimensional perception. However, the three dimensional effect is lost unless the viewer wears the LCD shutter eyeglasses.

One method of the prior art for causing a semi-transparent image to appear in front of a background is known as "Pepper's Ghost" and involves reflecting an image from a beam splitter placed in front of a scene. "Pepper's Ghost" provides only a single reflection. It does not allow multiple planes of transparent images. Furthermore, it cannot produce images that pass through each other in a direction parallel to the optical path to the viewer. Also, to produce expansive three dimensional images, the "Pepper's Ghost" technique requires a large three dimensional volume.

Another prior art method has been used for displaying the image of an object located behind a beam splitter. This method involves placing an object in an opaque enclosure having one side constructed of a beam splitter. A lamp that may be dimmed is placed inside the enclosure to illuminate the surface of the object facing the beam splitter. When the lamp is off, the object is not visible from outside the enclosure, and the beam splitter appears to be a mirror when viewed from the outside. When the lamp is on, the object can be seen through the beam splitter. This method does not allow multiple images to be superimposed on one another. This method cannot provide multiple planes of transparent images. Also, this method does not allow the image to be made to disappear without reverting to a mirror condition. Additionally, this method cannot produce images that pass through each other in a direction parallel to the optical path to the viewer. Furthermore, to provide large expansive three dimensional images, this technique requires a large three dimensional volume.

SUMMARY OF THE INVENTION

The present invention provides a method and apparatus for displaying three-dimensional virtual images. The present invention provides perspective and parallax automatically without adjusting the actual size of images to be displayed. The present invention provides stereo vision perceptual cues without the need for special eyeglasses or lenses over the eyes. The present invention allows multiple planes or volumes of semitransparent two or three dimensional images to overlap and/or pass through each other, even in directions towards and away from the viewer. The present invention also allows images beyond the walls of a labyrinth to seem to appear and disappear within the labyrinth. Furthermore, the present invention may be used to produce the perception of a deep volume while occupying only a compact space.

In the present invention, a series of beam splitters is configured as an optical labyrinth whereby multiple extended optical paths are constructed by positioning the beam splitters in planes that include the sides of equilateral triangles. The equilateral triangles are positioned adjacent to one another so as to create a network of equilateral triangles having common sides. By positioning objects, images or animated sequences of images behind the beam splitters and selectively lighting each of them, optical paths that appear to contain partially transparent images in three dimensions can be created. Several images can be simultaneously displayed in different regions of three dimensional space. An optical labyrinth provides a carefully planned path for light rays, but it need not have the form of a physical labyrinth.

In the preferred embodiment of the present invention, a series of beam splitters is used to construct an optical labyrinth. The beam splitters are two-way mirrors that differ from regular mirrors in that they have a coating, such as a partially silvered coating, that reflects a portion of the incident light striking the front surface, but also allows a portion of the incident light striking the rear surface to be transmitted through the two-way mirror. This property of beam splitters also allows them to be used as beam combiners. A first light beam can be reflected by the beam splitter, and a second light beam can be transmitted through the beam splitter. If the angles of reflection and transmission are properly aligned, light from the first and second light beams can be combined to form a third light beam. By controlling the amount of incident light on each side of the beam splitter, the images seen from each side can be controlled. In the preferred embodiment of the present invention, both sides of the beam splitters are maintained relatively unilluminated, while the images to be presented are illuminated. The beam splitters are positioned in planes that contain the common sides of a grid of adjacent equilateral triangles. Objects for producing images are positioned exterior to the labyrinth at locations relative to the beam splitters that result in the appearance of the objects at the desired location along an optical path.

Light from the object intended to have the most distant appearance radiates from that object and is reflected by a beam splitter placed in front of the object intended to have the second most distant appearance. In addition to reflecting the light from the object intended to have the most distant appearance, the beam splitter placed in front of the object intended to have the second most distant appearance also transmits light from the object intended to have the second most distant appearance through the beam splitter and into the optical path toward the viewer. The light from both the object intended to have the most distant appearance and the object intended to have the second most distant appearance is then reflected by a beam splitter positioned in front of an object intended to have the third most distant appearance. In addition to reflecting the light from the more distant appearing objects, the beam splitter in front of the object intended to have the third most distant appearance transmits the light from the object intended to have the third most distant appearance through the beam splitter and into the optical path toward the viewer. This process continues with subsequent beam splitters with the light from additional objects or images being added to the optical path directed toward the viewer. Ultimately, light from all of the objects or images reaches the viewer, and the viewer sees a composite image that includes the light from all of the objects or images. The light from the various objects or images is additively combined, causing the images to appear to be superimposed upon one another. Since light from the various objects and images travels different distances before reaching the viewer, the various images appear in perspective and with parallax at their respective apparent distances. The images can also be made to move and to pass through each other by moving their positions relative to their respective beam splitters. Thus, the disadvantages of the prior art have been overcome.

DETAILED DESCRIPTION OF THE INVENTION

A method and apparatus for displaying a three dimensional virtual image are described, In the following description, numerous specific details are set forth in order to provide a more thorough understanding of the present invention, It will be apparent, however, to one skilled in the art, that the present invention may be practiced without these specific details, In other instances, well-known features have not been described in detail in order not to unnecessarily obscure the present invention, In the past, it has not been possible to display a three dimensional virtual image that can include visual components derived from different sources, each of which can be individually controlled, such that the components appear superimposed on each other with the proper perspective and parallax. Such a display system would be useful for entertainment, production of animated sequences and three dimensional imaging applications, such as architecture and engineering. Therefore, there is a need for such a system.

The present invention avoids these problems by using beam splitters oriented to allow multiple images to be introduced into an optical path to a viewer with the appearance that the images are at different distances from the viewer. The beam splitters allow transmission of light from a light source through the beam splitter and reflection of light from an incident optical path to a reflected optical path. If the light source producing the light transmitted through the beam splitter is aligned properly, the transmitted light can be made to join the reflected optical path. Thus, a viewer of the reflected optical path will see the transmitted light from the light source superimposed on the incident light from the incident optical path. By combining the light from all light sources, the viewer will see a composite image with light from each of the light sources superimposed on the light from the other light sources. The composite image provides the correct perspective and parallax to show the three dimensional relationship between the light sources. Each eye sees the correct component of stereo vision information. Thus, stereo vision is provided.

Figure 1A:
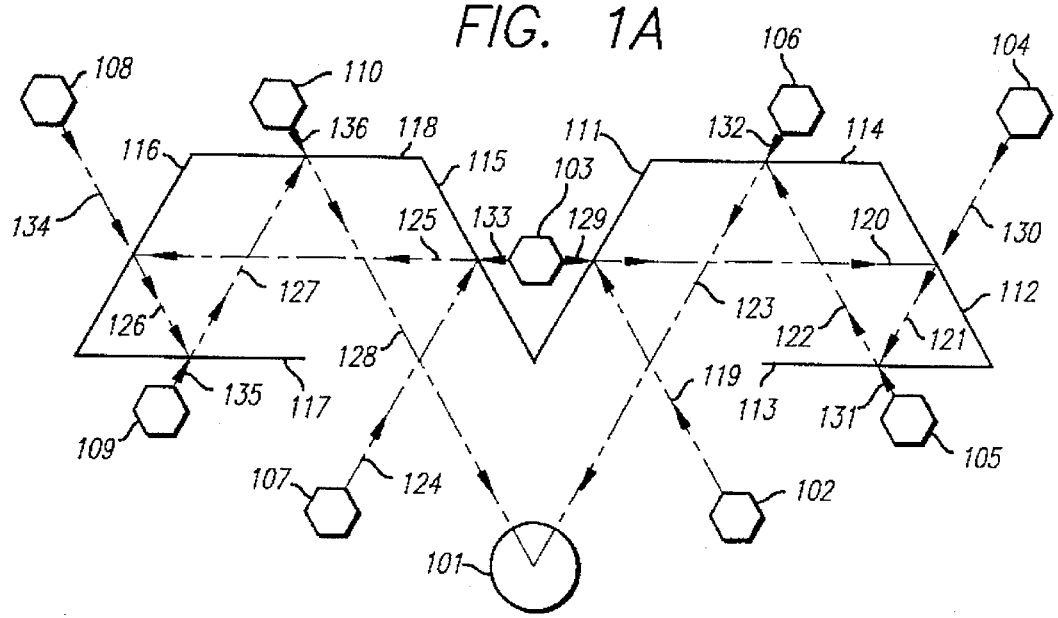
FIG. 1A is a cross section of the preferred embodiment of the present invention.

FIG. 1A illustrates the preferred embodiment of the present invention. Viewer 101 is positioned in front of an optical labyrinth. The optical labyrinth is comprised of an assembly of beam splitters that includes beam splitters 111, 112, 113, 114, 115, 116, 117 and 118. The beam splitters are oriented at angles that are multiples of 60° to each other. Objects 102, 103, 104, 105, 106, 107, 108, 109 and 110 are positioned at locations around the beam splitter assembly. A first optical path is comprised of light rays 119, 120, 121, 122, 123. A second optical path is comprised of light rays 124, 125, 126, 127 and 128. Light rays 129, 130, 131 and 132 from objects 103, 104, 105 and 106, respectively, are added to the first optical path before the first optical path is viewed by viewer 101. Light rays 133, 134, 135 and 136 from objects 103, 108, 109 and 110 are added to the second optical path before the second optical path is viewed by viewer 101.

Viewer 101 may be one or more humans, animals, video cameras, movie cameras, still cameras, any other cameras or photosensitive devices, such as one or more photodiodes, phototransistors, photoresistive elements, photovoltaic cells or charge coupled devices (CCDs), or a combination of any of the above. The vision or photosensitivity of viewer 101 may be directed toward beam splitter 114 or toward beam splitter 118.

The ambient illumination level of the elements in FIG. 1A is maintained substantially in darkness, although the present invention may also be practiced with other ambient illumination levels. Objects 102, 103, 104, 105, 106, 107, 108, 109 and 110 may be physical objects or may be real or virtual (i.e. apparent) images. One or more of the objects may be replaced by another virtual image display system according to the present invention that is located so as to put the position where a viewer of the second display system would be at the position where the object to be replaced would be. Alignment of the angles of the light rays should be maintained if such a replacement is to be made. The light rays that would have entered the viewer of the second display system should be collinear with the light rays that would have left the object to be replaced.

Beam splitters 111, 112, 113, 114, 115, 116, 117 and 118 may be partially silvered mirrors or other optical elements providing partial transmission and partial reflection. Beam splitters may be constructed on transparent substrates of glass, plastic, such as acrylic, polycarbonate or mylar, or any other suitable optical material. Beam splitters have a first surface and a second surface. The first and second surfaces may be substantially coplanar. For example, a partial coating of a metallic substance, such as silver, aluminum, nickel or some alloy, may be deposited on one side of a transparent glass substrate using an electroplating process, vapor deposition process, electron beam deposition process, ion deposition process, sputtering process, or some other suitable process. An anti-reflective coating may be applied to the opposite side of the glass substrate. A beam splitter thus constructed includes the metallic layer and has one surface adjacent to the glass substrate and another surface opposite the glass substrate. It is desirable to keep the metallic layer thin so as to make the two surfaces substantially coplanar. It is also desirable to reduce reflections from the opposite side of the substrate, such as by applying an anti-reflective coating. These measures help assure good image quality.

Beam splitters are available with different levels of transmittance and reflectance. For example, a 50% transmittance/50% reflectance beam splitter transmits 50% of the incident light and reflects 50% of the incident light. The present invention may be practiced with 40% transmittance/60% reflectance beam splitters, although by controlling the lighting, beam splitters having a wide range of transmittance and reflectance characteristics may be used. Different beam splitters within a single embodiment may also have different transmittance and reflectance characteristics.

Light rays 119 from object 102 are reflected by beam splitter 111. Light rays 129 from object 103 are transmitted through beam splitter 111 and join the reflection of light rays 119 to form light rays 120. Light rays 120 are reflected by beam splitter 112. Light rays 130 from object 104 are transmitted through beam splitter 112 and join the reflection of light rays 120 to form light rays 121. Light rays 121 are reflected by beam splitter 113. Light rays 131 from object 105 are transmitted through beam splitter 113 and join the reflection of light rays 121 to form light rays 122. Light rays 122 are reflected by beam splitter 114. Light rays 132 from object 106 are transmitted through beam splitter 114 and join the reflection of light rays 122 to form light rays 123. Light rays 123 are visible to viewer 101.

Light rays 124 from object 107 are reflected by beam splitter 115. Light rays 133 from object 103 are transmitted through beam splitter 115 and join the reflection of light rays 124 to form light rays 125. Light rays 125 are reflected by beam splitter 116. Light rays 134 from object 108 are transmitted through beam splitter 116 and join the reflection of light rays 125 to form light rays 126. Light rays 126 are reflected by beam splitter 117. Light rays 135 from object 109 are transmitted through beam splitter 117 and join the reflection of light rays 126 to form light rays 127. Light rays 127 are reflected by beam splitter 118. Light rays 136 from object 110 are transmitted through beam splitter 118 and join the reflection of light rays 127 to form light rays 128. Light rays 128 are visible to viewer 101.

Since light rays originating beyond objects 102, 103, 104, 105, 106, 107, 108, 109 and 110 may join the optical path toward viewer 101, any extraneous light sources should be controlled to avoid interference. It is preferable to surround the sides of objects 102, 103, 104, 105, 106, 107, 108, 109 and 110 away from the optical labyrinth with a light shielding material, such as an opaque black curtain. Other means of controlling ambient and extraneous light may be used.

Figure 1B:
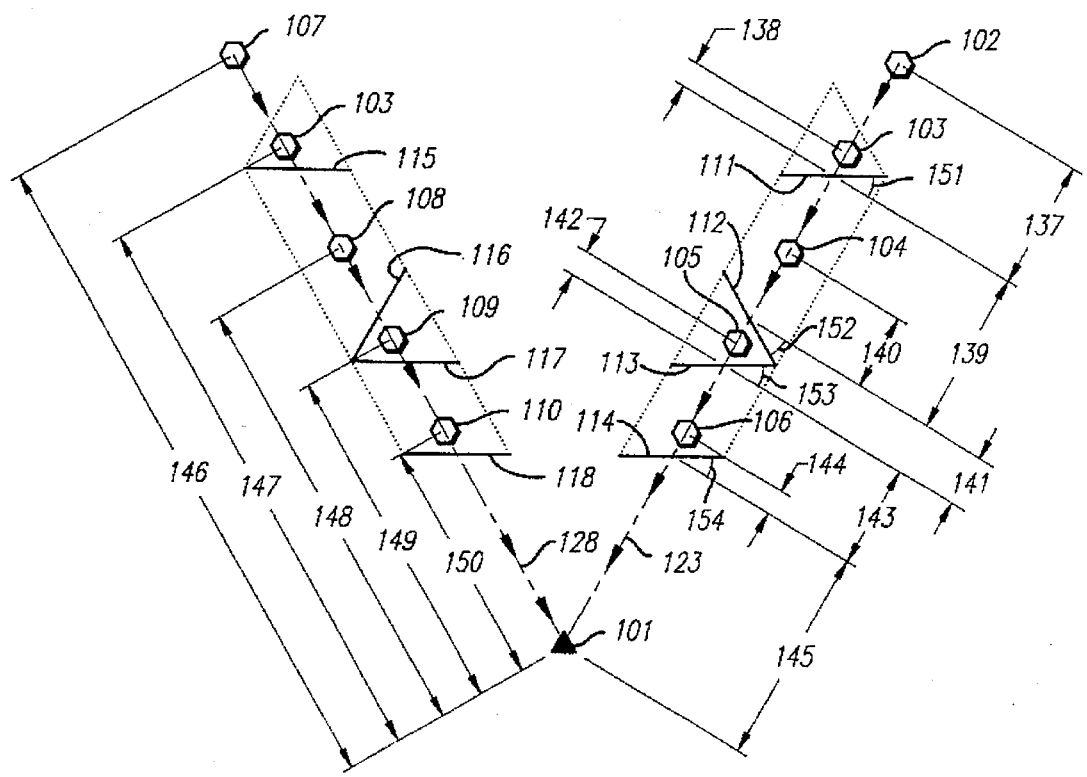
FIG. 1B is a cross section illustrating the apparent arrangement of the embodiment of FIG. 1A as viewed by viewer 101.

FIG. 1B is a cross section of the apparent arrangement of the embodiment of FIG. 1A as viewed by viewer 101. If viewer 101 looks in a first direction, viewer 101 sees objects 102, 103, 104, 105 and 106. Object 106 appears in the foreground, with object 105 behind object 106, object 104 behind object 105, object 103 behind object 104, and object 102 behind object 103. If viewer 101 looks in a second direction, viewer 101 sees objects 107, 103, 108, 109 and 110. Object 110 appears in the foreground, with object 109 behind object 110, object 108 behind object 109, object 103 behind object 108, and object 107 behind object 103. Since object 103 is viewed from different angles when viewer 101 is looking in the first direction than when viewer 101 is looking in the second direction, the image of object 103 that appears behind object 104 may be different than the image of object 103 that appears behind object 108.

By changing the positions of the objects relative to the beam splitters, the apparent positions of the objects can be altered. The apparent distance of the objects from the viewer can be changed in this manner. Objects can be made to appear to move closer to the viewer or farther from the viewer. Objects can even be made to appear as if they are moving through other objects. Thus, the apparent order of the objects can be changed. For example, by moving object 104 away from beam splitter 112 along an extension of the line of light rays 130, object 104 can be made to appear as if it is moving farther from viewer 101. As object 104 is being moved away, at some point object 104 will appear to move through object 103. If object 104 is moved farther away, object 104 will appear to be positioned between objects 102 and 103. Other objects can be moved in other directions for other similar effects.

When viewer 101 is looking in the first direction, an image of object 102 is reflected by beam splitter 111, and an image of object 103 is transmitted through beam splitter 111. The combined image of objects 102 and 103 is reflected by beam splitter 112, and an image of object 104 is transmitted through beam splitter 112. The combined image of objects 102, 103 and 104 is reflected by beam splitter 113, and an image of object 105 is transmitted through beam splitter 113. The combined image of objects 102, 103, 104 and 105 is reflected by beam splitter 114, and an image of object 106 is transmitted through beam splitter 114. The combined image of objects 102, 103, 104, 105 and 106 travels along optical path 123 to viewer 101 and appears to viewer 101 as a composite three dimensional image.

The optical path does not pass through beam splitters 111, 112, 113 and 114 at a perpendicular angle. Rather, beam splitters 111, 112, 113 and 114 are slanted 30° relative to perpendicular. Beam splitter 111 is slanted at 30° angle 151. Beam splitter 112 is slanted at 30° angle 152. Beam splitter 113 is slanted at 30° angle 153. Beam splitter 114 is slanted at 30° angle 154.

The center of object 102 is located distance 137 away from the center of beam splitter 111. The center of object 103 is located distance 138 away from the center of beam splitter 111. The center of beam splitter 111 is located distance 139 away from the center of beam splitter 112. The center of object 104 is located distance 140 away from the center of beam splitter 112. The center of beam splitter 112 is located distance 141 away from the center of beam splitter 113. The center of object 105 is located distance 142 away from the center of beam splitter 113. The center of beam splitter 113 is located distance 143 away from the center of beam splitter 114. The center of object 106 is located distance 144 away from the center of beam splitter 114. The center of beam splitter 114 is located distance 145 away from viewer 101.

When viewer 101 is looking in the second direction, an image of object 107 is reflected by beam splitter 115, and an image of object 103 transmitted through beam splitter 115. The combined image of objects 107 and 103 is reflected by beam splitter 116, and an image of object 108 is transmitted through beam splitter 116. The combined image of objects 107, 103 and 108 is reflected by beam splitter 117, and an image of object 109 is transmitted through beam splitter 117. The combined image of objects 107, 103, 108 and 109 is reflected by beam splitter 118, and an image of object 110 is transmitted through beam splitter 118. The combined image of objects 107, 103, 108, 109 and 110 travels along optical path 128 to viewer 101 and appears to viewer 101 as a composite three dimensional image.

Object 107 appears to be located distance 146 away from viewer 101. Object 103 appears to be located distance 147 away from viewer 101. Object 108 appears to be located distance 148 away from viewer 101. Object 109 appears to be located distance 149 away from viewer 101. Object 110 appears to be located distance 150 away from viewer 101.

Although the present invention may be practiced over a wide range of dimensions, the dimensions of the preferred embodiment are given as an example. Distance 150 is 4.5 feet (approximately 1.37 meters). Distance 145 is 4 feet (approximately 1.22 meters). Distance 144 is 0.5 feet (approximately 0.15 meters). Distance 149 is 6.5 feet (approximately 1.98 meters). Distance 143 is 2 feet (approximately 0.61 meters). Distance 142 is 0.5 feet (approximately 0.15 meters). Distance 148 is 8.5 feet (approximately 2.59 meters). Distance 141 is 1 foot (approximately 0.30 meters). Distance 140 is 1.5 feet (approximately 0.46 meters). Distance 147 is 10.5 feet (approximately 3.20 meters). Distance 139 is 3 feet (approximately 0.91 meters). Distance 138 is 0.5 feet (approximately 0.15 meters). Distance 146 is 12.5 feet (approximately 3.81 meters). Distance 137 is 2.5 feet (approximately 0.76 meters).

Figure 2A:
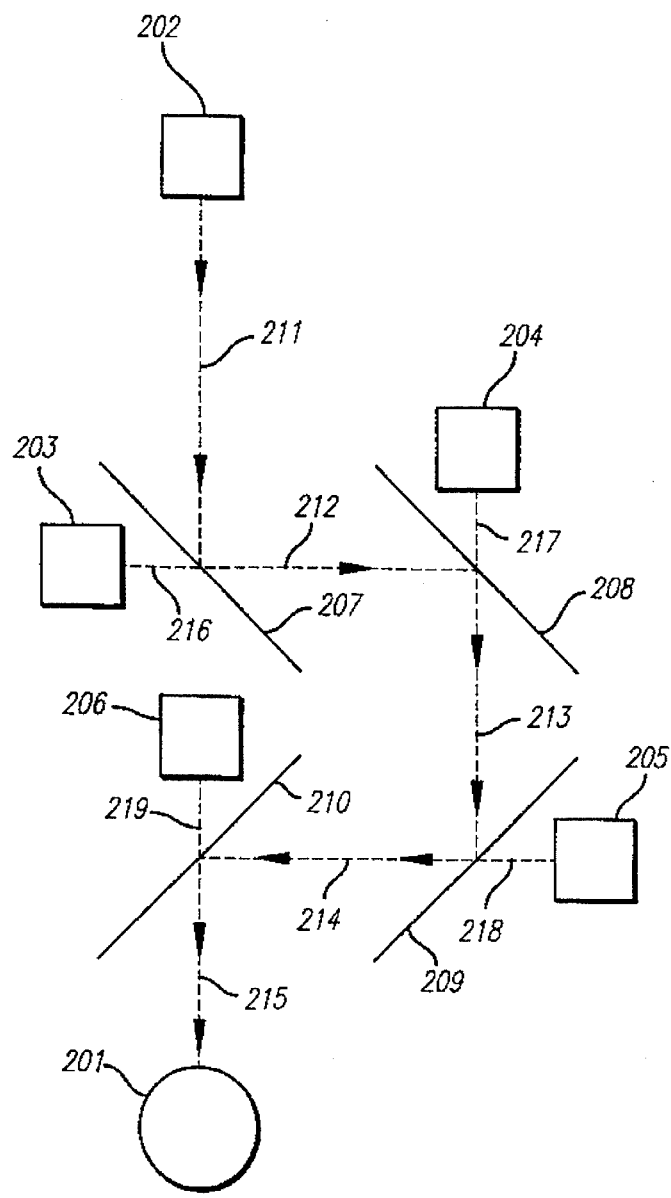
FIG. 2A is a cross section of an alternate embodiment of the present invention.

FIG. 2A is a cross section of an alternate embodiment of the present invention. Viewer 201 views an optical path comprising light rays 211, 212, 213, 214 and 215. Objects 202, 203, 204, 205 and 206 may be any objects or real or virtual images.

Light rays 211 from object 202 are reflected by beam splitter 207. Light rays 216 from object 203 are transmitted through beam splitter 207 and join the reflection of light rays 211 to form light rays 212. Light rays 212 are reflected by beam splitter 208. Light rays 217 from object 204 are transmitted through beam splitter 208 and join the reflection of light rays 212 to form light rays 213. Light rays 213 are reflected by beam splitter 209. Light rays 218 from object 205 are transmitted through beam splitter 209 and join the reflection of light rays 213 to form light rays 214. Light rays 214 are reflected by beam splitter 210. Light rays 219 from object 206 are transmitted through beam splitter 210 and join the reflection of light rays 214 to form light rays 215. Light rays 215 are visible to viewer 201.

Figure 2B:
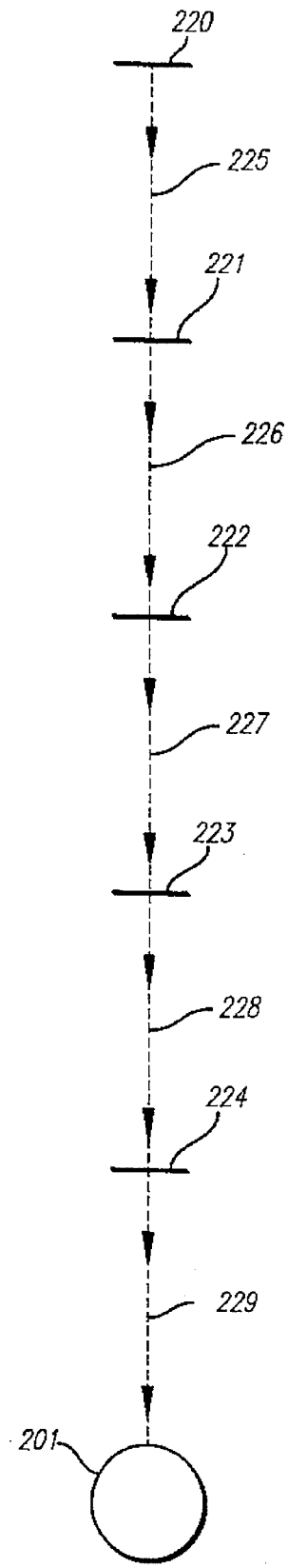
FIG. 2B is a cross section illustrating the apparent arrangement of the embodiment of FIG. 2A as viewed by viewer 201.

FIG. 2B is a cross section illustrating the apparent arrangement of the embodiment of FIG. 2A as viewed by viewer 201. Image 220 is represented by light rays 225.

Image 221 combines with light rays 225, resulting in light rays 226. Image 222 combines with light rays 226, resulting in light rays 227. Image 223 combines with light rays 227, resulting in light rays 228. Image 224 combines with light rays 228, providing light rays 229. Light rays 229 are viewed by viewer 201. Image 220 is an image of object 202 that is represented by light rays 211. Image 221 is an image of object 203 that is represented by light rays 216. Image 222 is an image of object 204 that is represented by light rays 217. Image 223 is an image of object 205 that is represented by light rays 218. Image 224 is an image of object 206 that is represented by light rays 219. When viewer 201 looks toward beam splitter 210 of FIG. 2A, viewer 201 appears to see image 224 in the foreground with image 223 behind image 224, image 222 behind image 223, image 221 behind image 222, and image 220 behind image 221. Images 224, 223, 222, 221 and 220 appear to be separated in space along the viewer's line of sight as shown by light rays 229, 228, 227, 226 and 225.

Figure 3A:
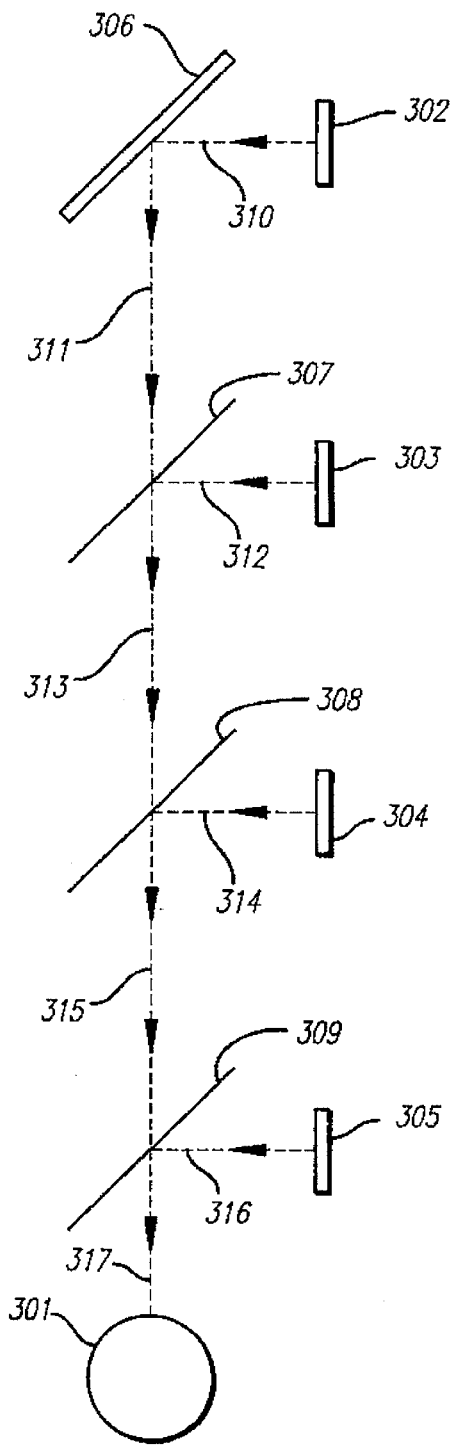
FIG. 3A illustrates a cross section of an alternate embodiment of the present invention.

FIG. 3A illustrates a cross section of an alternate embodiment of the present invention. Viewer 301 views a composite image comprising images 302, 303, 304 and 305. Images 302, 303, 304 and 305 may be images produced by objects or real or virtual images. Mirror 306 is a regular fully silvered mirror, preferably a front surface mirror. Beam splitters 307, 308 and 309 are beam splitters that provide partial transmission and partial reflection of light. Light rays 310 from image 302 are reflected by minor 306 to give light rays 311. Light rays 312 are reflected by beam splitter 307. Light rays 311 are transmitted through beam splitter 307 and join the reflection of light rays 312 to form light rays 313. Light rays 314 from image 304 are reflected by beam splitter 308. Light rays 313 are transmitted through beam splitter 308 and join the reflection of light rays 314 to form light rays 315. Light rays 316 from image 305 are reflected by beam splitter 309. Light rays 315 are transmitted through beam splitter 309 and join the reflection of light rays 316 to give light rays 317. Light rays 317 represent the composite image that is viewed by viewer 301. If there is concern that viewer 301 may view light from image 305 directly (i.e., before it is reflected by beam splitter 309, an opaque object may be placed between image 305 and viewer 301 as a shield, or a shielding device, such as micro-louvers of the type available from 3M Corporation of St. Paul, Minn., may be used to direct and control the light from image 305. Such shielding devices may be used in other embodiments of the present invention, as well.

Figure 3B:
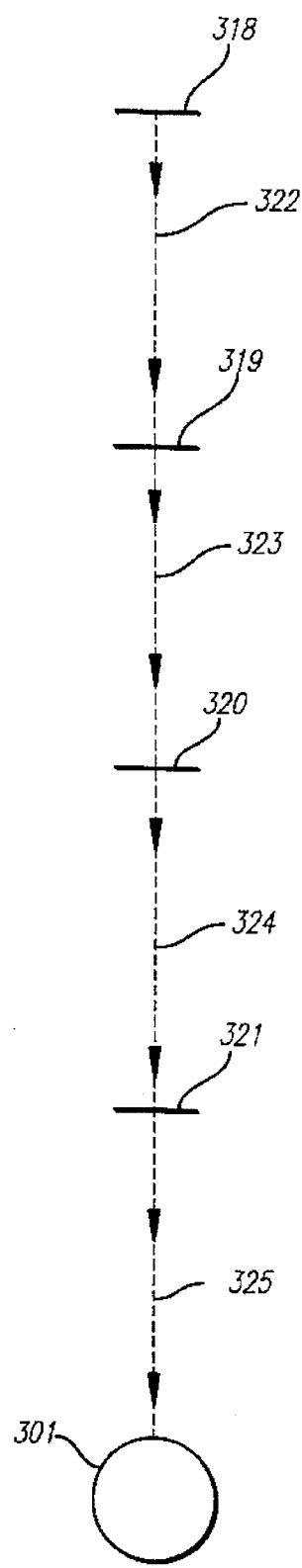
FIG. 3B is a cross section illustrating the apparent arrangement of the embodiment of FIG. 3A as viewed by viewer 301.

FIG. 3B is a cross section illustrating the apparent arrangement of the embodiment of FIG. 3A as viewed by viewer 301. Images 318, 319, 320 and 321 are images having transparency and luminosity, representative of images 302, 303, 304 and 305, respectively. Image 318 is represented by light rays 322. Image 319 combines with light rays 322, resulting in light rays 323. Image 320 combines with light rays 323, resulting in light rays 324. Image 321 combines with light rays 324, resulting in light rays 325. Light rays 325 are viewed by viewer 301. Image 321 appears to be in front of viewer 301 with image 320 behind image 321, image 319 behind image 320, and image 318 behind image 319. Images 321, 320, 319 and 318 appear to be separated as indicated by light rays 324, 323 and 322. Image 321 appears to be separated from viewer 301 as indicated by light rays 325.

The present invention is not limited to optical labyrinths or optical arrangements based on 60°0 or 45° angles, but may be practiced with other angles. The beam splitters of an embodiment of the present invention need not all be aligned at identical angles, but various angles may be used within the same embodiment. Also, images of objects may be introduced into the optical path toward the viewer either by reflecting them from beam splitters or by transmitting them through beam splitters. The present invention may be practiced with some images of objects transmitted through beam splitters to combine them with the images of other objects and other images of objects reflected by beam splitters to combine them with images of other objects.

Figures 4, 5:
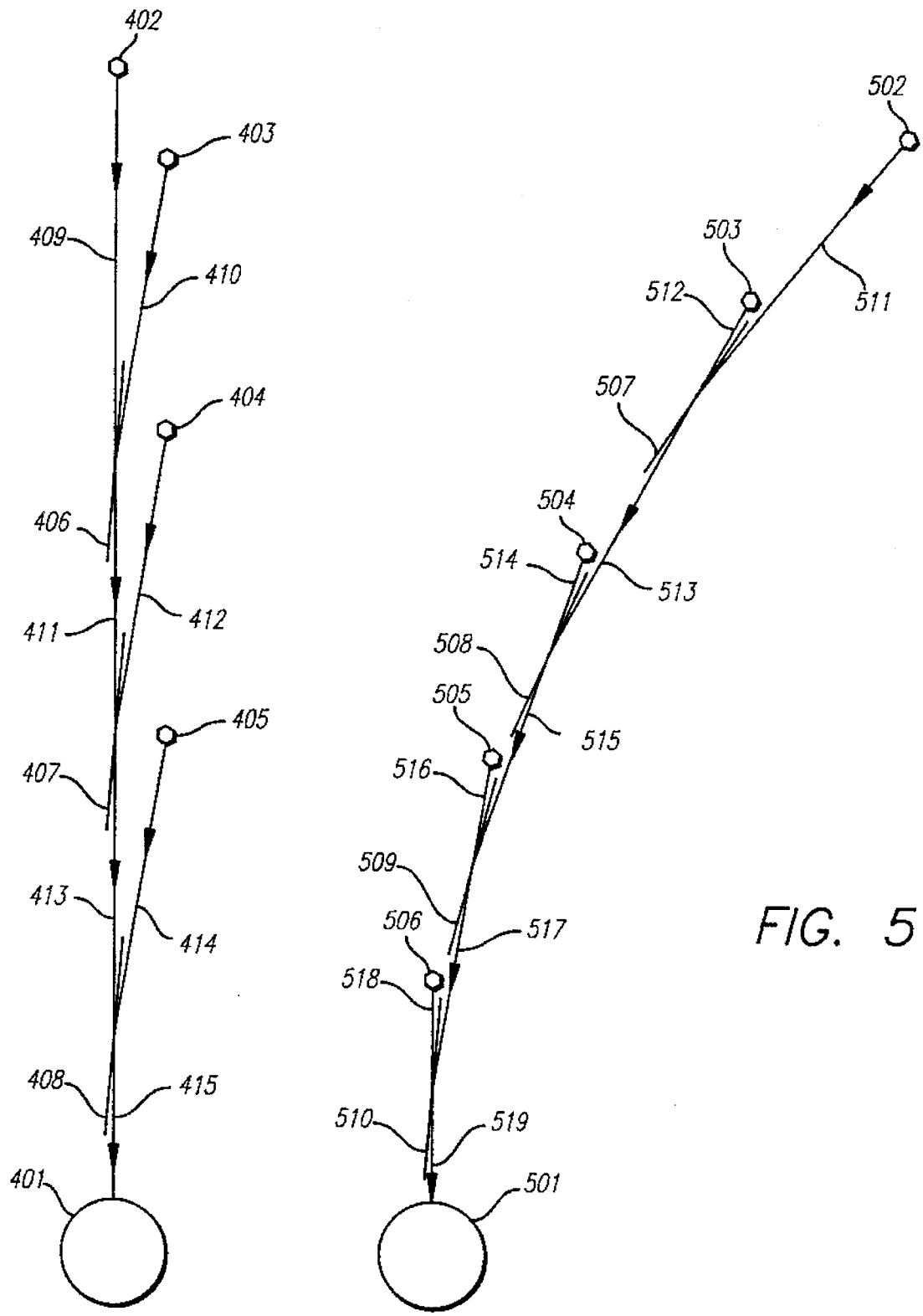
FIG. 4 is a cross section of an embodiment of the present invention with a large angle of incidence.
FIG. 5 is a cross section of an embodiment of the present invention with a large angle of incidence.

FIG. 4 is a cross section of an embodiment of the present invention with a large angle of incidence. Light rays 409 from object 402 are transmitted through beam splitter 406 to combine with light rays 410 from object 403, which are reflected by beam splitter 406, to form light rays 411. Light rays 411 are transmitted through beam splitter 407 to combine with light rays 412 from object 404, which are reflected by beam splitter 407, to form light rays 413. Light rays 413 are transmitted through beam splitter 408 to combine with light rays 414 from object 405, which are reflected by beam splitter 408, to form light rays 415, which are viewed by viewer 401.

FIG. 5 is a cross section of an embodiment of the present invention with a large angle of incidence. Light rays 511 from object 502 are reflected by beam splitter 507 to combine with light rays 512 from object 503, which are transmitted by beam splitter 507, to form light rays 513. Light rays 513 are reflected by beam splitter 508 to combine with light rays 514 from object 504, which are transmitted through beam splitter 508, to form light rays 515. Light rays 515 are reflected by beam splitter 509 to combine with light rays 516 from object 505, which are transmitted through beam splitter 509, to form light rays 517. Light rays 517 are reflected by beam splitter 510 to combine with light rays 518 from object 506, which are transmitted through beam splitter 510, to form light rays 519, which are viewed by viewer 501.

Figure 6:
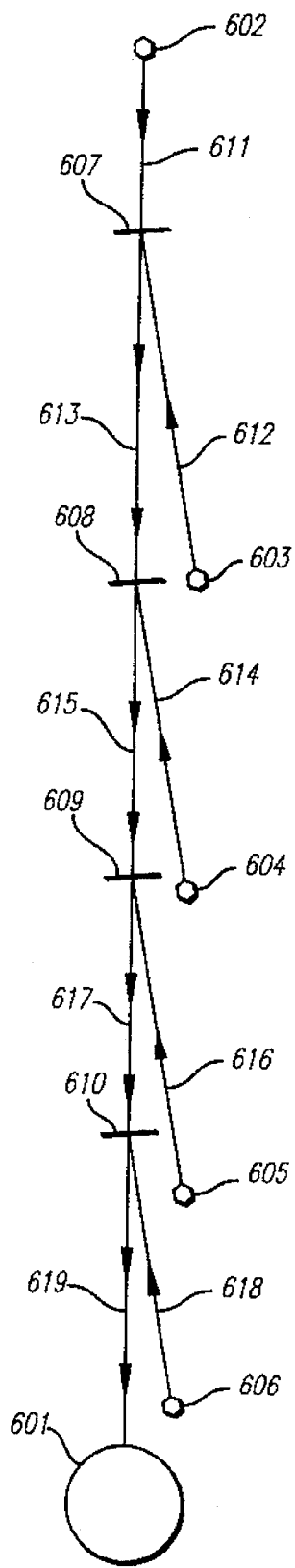
FIG. 6 is a cross section of an embodiment of the present invention with small angles of incidence.

FIG. 6 is a cross section of an embodiment of the present invention with small angles of incidence. Light rays 611 from object 602 are transmitted through beam splitter 607 to combine with light rays 612 from object 603, which are reflected by beam splitter 607, to form light rays 613. Light rays 613 are transmitted through beam splitter 608 to combine with light rays 614 from object 604, which are reflected by beam splitter 608, to form light rays 615. Light rays 615 are transmitted through beam splitter 609 to combine with light rays 616 from object 605, which are reflected by beam splitter 609, to form light rays 617. Light rays 617 are transmitted through beam splitter 610 to combine with light rays 618 from object 606, which are reflected by beam splitter 610, to form light rays 619, which are viewed by viewer 601.

Figure 7:
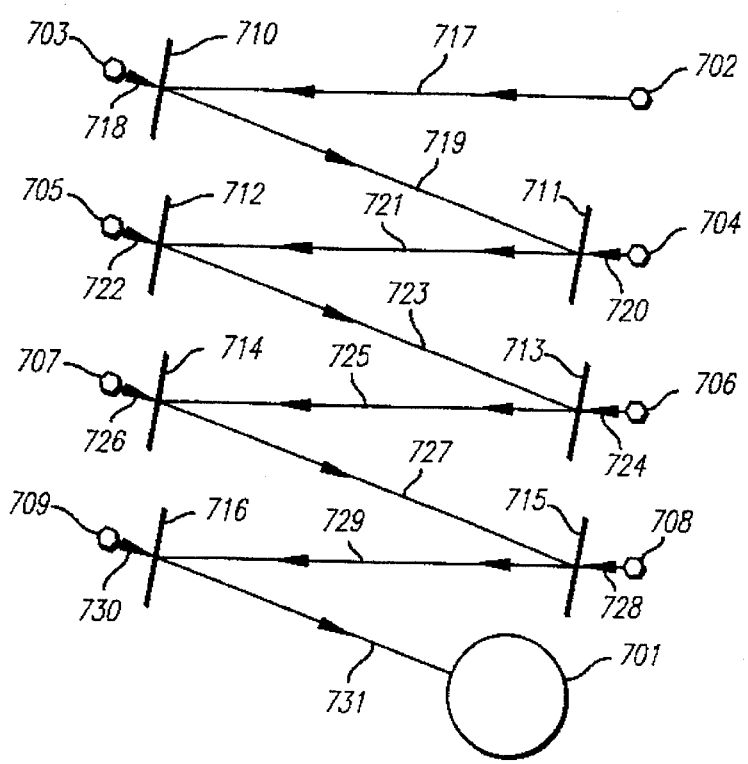
FIG. 7 is a cross section of an embodiment of the present invention with small angles of incidence.

FIG. 7 is a cross section of an embodiment of the present invention with small angles of incidence. Light rays 717 from object 702 are reflected by beam splitter 710 to combine with light rays 718 from object 703, which are transmitted through beam splitter 710, to form light rays 719. Light rays 719 are reflected by beam splitter 711 to combine with light rays 720 from object 704, which are transmitted through beam splitter 711, to form light rays 721. Light rays 721 are reflected by beam splitter 712 to combine with light rays 722 from object 705, which are transmitted through beam splitter 712, to form light rays 723. Light rays 723 are reflected by beam splitter 713 to combine with light rays 724 from object 706, which are transmitted through beam splitter 713, to form light rays 725. Light rays 725 are reflected by beam splitter 714 to combine with light rays 726 from object 707, which are transmitted through beam splitter 714, to form light rays 727. Light rays 727 are reflected by beam splitter 715 to combine with light rays 728 from object 708, which are transmitted through beam splitter 715, to form light rays 729. Light rays 729 are reflected by beam splitter 716 to combine with light rays 730 from object 709, which are transmitted through beam splitter 716, to form light rays 731, which are viewed by viewer 701.

Figure 8:
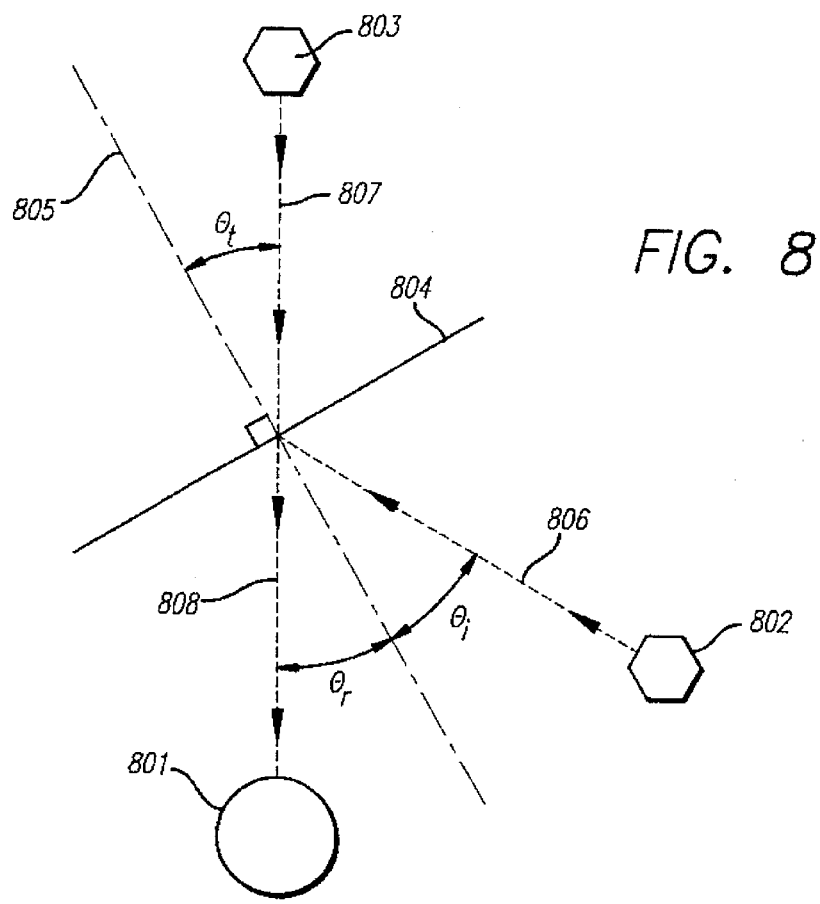
FIG. 8 is a cross section of a beam splitter of the present invention showing angles of incidence, reflection, and transmission.

FIG. 8 is a cross section of a beam splitter of the present invention showing angles of incidence, reflection, and transmission. Light rays 806 from object 802 are reflected by beam splitter 804. Light rays 807 from object 803 are transmitted through beam splitter 804. Light rays 808 are formed from the combination of light rays 806 and 807 by beam splitter 804. Light rays 808 are viewed by viewer 801. Normal line 805 represents a line perpendicular to beam splitter 804. Light rays 806 form an angle with normal line 805 known as the angle of incidence, denoted $\theta_i$. Light rays 808 form an angle with normal line 805 known as the angle of reflection, denoted $\theta_r$. Light rays 807 form an angle with normal line 805 known as the angle of transmission, denoted $\theta_t$. It is a well-known principle of optics that $\theta_i=\theta_r$. Furthermore, for the image of object 803 to be visible and aligned with the image of object 802, $\theta_i=\theta_r=\theta_t$.

Figure 9:
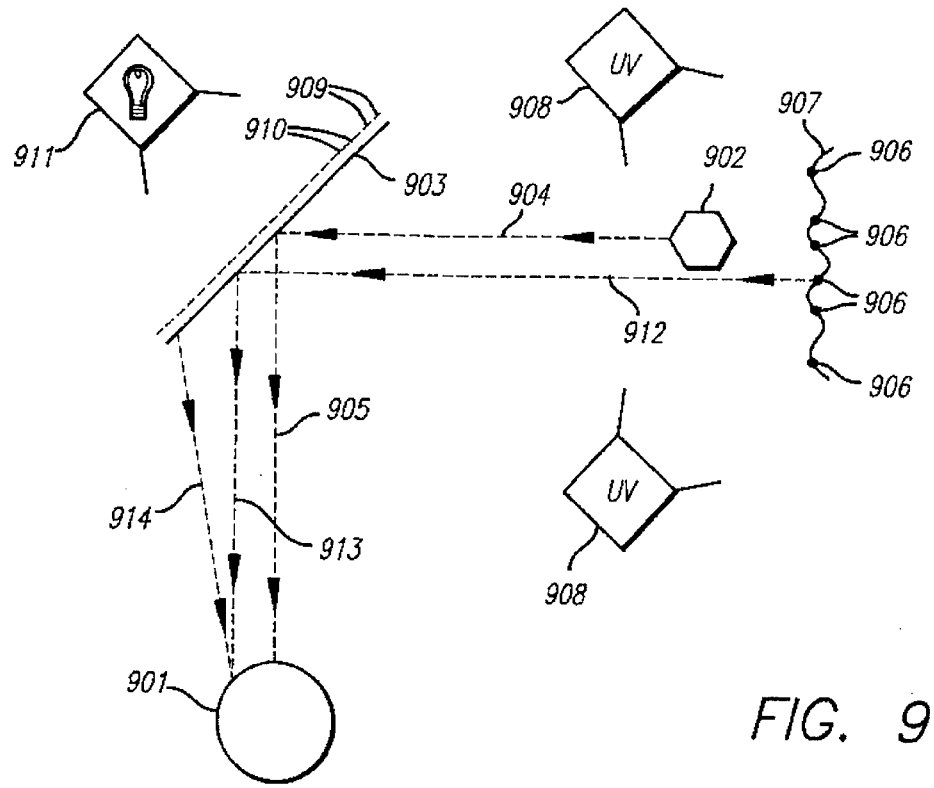
FIG. 9 is a cross section of an embodiment of the present invention that allows incandescent and ultraviolet (UV) lighting effects to be combined.

FIG. 9 is a cross section of an embodiment of the present invention that allows incandescent and ultraviolet (UV) lighting effects to be combined. Object 902 may be painted with fluorescent paint to provide a glow under ultraviolet light. Object 902 is illuminated by UV lamps 908. Light rays 904 from object 902 are reflected by beam splitter 903 to provide light rays 905, which are viewed by viewer 901. Object 902 is placed against opaque black curtain 907. Fluorescent dots 906 have been painted on opaque black curtain 907. UV lamps 908 illuminate fluorescent dots 906 with UV light, causing them to glow with visible light. Light rays 912 from fluorescent dots 906 are reflected by beam splitter 903 to provide light rays 913, which are viewed by viewer 901. Opaque black board 909 with perforations 910 is placed against the back of beam splitter 903. Incandescent lamp 911 is placed behind opaque black board 909 and perforations 910. Light rays from incandescent lamp 911 pass through perforations 910 and are transmitted through beam splitter 903 to form light rays 914, which are viewed by viewer 901. Although fluorescent dots 906 and perforations 910 may be of any shape or size to produce a desired effect, small roughly circular dots and perforations may be used to provide a "star field" behind object 902. Thus, object 902 can be made to appear against a background of stars and other objects of outer space. The present invention allows incandescent lighting effects or images to be used in conjunction with UV lighting effects or images.

The present invention allows relative large apparent volumes to be simulated in a relatively compact space. By arranging the beam splitters and objects in a geometry that allows light rays to pass through the same region of space or in regions of space in close proximity to one another, the light rays can travel a substantial distance within a small space. Since light rays passing through the same region of space as other light rays will not interfere with the other light rays unless they are oriented in the same direction as the other light rays, compact arrangements can be made by having light rays pass through each other at angles to each other. Examples of this type of arrangement can be seen in FIG. 1A, where light rays 119 and 120 pass through light rays 123 at angles to them. Another example is where light rays 122 and 123 pass through light rays 120. Because of this "folded" nature of the optical arrangement, the present invention can simulate a relatively large volume in a compact space.

The present invention may be used to provide continuous three dimensional imaging and movement. To maintain continuity, the scale of images may be adjusted to force images to be viewed in perspective at various distances. For example, considering one half of the preferred embodiment of the present invention illustrated in FIG. 1A, CRTs may be used as objects 102, 103, 104, 105 and 106. To make an image appear to approach the viewer from a distance, the image may first be displayed on the CRT represented by object 102. The image may first be displayed at a smaller scale than normal, and gradually increased in size to a size larger than normal. To the viewer, this change in size appears to represent a change in perspective as the apparent object seems to come closer to viewer 101. At an appropriate point, the image may be switched from being displayed larger than normal on the CRT represented by object 102 to being displayed smaller than normal on a CRT represented by object 103. The size of the image on the CRT represented by object 103 can be gradually increased until it is larger than normal. At an appropriate point, the image may be switched from being displayed larger than normal on the CRT represented by object 103 to being displayed smaller than normal on a CRT represented by object 104. The size of the image on the CRT represented by object 104 can be gradually increased until it is larger than normal. At an appropriate point, the image may be switched from being displayed larger than normal on the CRT represented by object 104 to being displayed smaller than normal on a CRT represented by object 105. The size of the image on the CRT represented by object 105 can be gradually increased until it is larger than normal. At an appropriate point, the image may be switched from being displayed larger than normal on the CRT represented by object 105 to being displayed smaller than normal on a CRT represented by object 106. The size of the image on the CRT represented by object 106 may be gradually increased to provide the appearance of the image coming toward the viewer. By forcing a desired amount of perspective by scaling an image, the image can be made to appear to move slightly back and forth along the optical path. By carefully matching the transition from the CRT represented by one object to the CRT represented by another object, three dimensional motion and images can be provided and continuity between CRTs can be maintained.

Thus, a method and apparatus for the display of a three dimensional virtual image that provides proper perspective and parallax and that can be constructed in a compact manner has been provided.

I claim:

1. A display comprising:

a first image source;

a second image source;

a first beam splitter positioned such that a first image from said first image source is reflected by said first beam splitter and a second image from said second image source is transmitted through said first beam splitter so as to provide a third image as a composite image of said first and second images;

a third image source;

a second beam splitter positioned such that said third image is reflected by said second beam splitter and a fourth image from said third image source is transmitted through said second beam splitter so as to provide fifth image as a composite image of said third and fourth images.

2. The display of claim 1 wherein said first beam splitter and said second beam splitter are included in an optical labyrinth.

3. The display of claim 2 wherein said optical labyrinth is based on angles that are multiples of 60°.

4. The display of claim 2 wherein said optical labyrinth is based on angles that are multiples of 45°.

5. A display comprising:

a first image source;

a second image source;

a first beam splitter positioned such that a first image from said first image source is reflected by said first splitter and a second image from said second image source is transmitted through said first beam splitter so as to provide a third image as a composite image of said first and second images;

a third image source;

a second beam splitter positioned such that said third image is transmitted through said second beam splitter and a fourth image from said third image source is reflected by said second beam splitter so as to provide a fifth image.

6. The display of claim 5 wherein said first beam splitter and said second beam splitter are included in an optical labyrinth.

7. The display of claim 6 wherein said optical labyrinth is based on angles that are multiples of 60°.

8. The display of claim 6 wherein said optical labyrinth is based on angles that are multiples of 45°.

9. A display comprising:

a first image source;

a second image source;

a first beam splitter having a first surface and a second surface, said first beam splitter positioned such that said first image source is in a first line of sight to said first surface of said first beam splitter and said second image source is in a second line of sight to said second surface of said first beam splitter, said first beam splitter for reflecting a first set of light rays from said first image source and for transmitting a second set of light rays from said second image source so as to provide a third set of light rays as a composite of said first and second set of light rays;

a third image source a second beam splitter having a third surface and fourth surface, said second beam splitter positioned such that said third image source is in a third line of sight to said fourth surface of said second beam splitter, said third set of light rays is incident upon said third surface of said second beam splitter, said second beam splitter for reflecting said third set of light rays and for transmitting a fourth set of light rays from said third image source so as to provide a fifth set of light rays as a composite of said third and fourth set of light rays;

wherein said first beam splitter and said second beam splitter are included in an optical labyrinth.

10. The display of claim 9 wherein said optical labyrinth is based on angles that are multiples of 60°.

11. The display of claim 9 wherein said optical labyrinth is based on angles that are multiples of 45°.

12. A method for displaying an apparent three dimensional image comprising the steps of:

reflecting a first image along an optical path toward a viewer;

transmitting a second image along said optical path toward said viewer;

transmitting a third image along said optical path toward said viewer, thereby providing said viewer with a composite image of said first, second, and third images;

wherein said first image is made to appear a first distance away from said viewer, said second image is made to appear a second distance away from said viewer, and said third image is made to appear a third distance away from said viewer.

13. The method of claim 12 wherein said first distance and said second distance are equal to each other.

14. The method of claim 12 wherein said first distance and said second distance are not equal to each other.

15. The method of claim 12 further comprising the step of reflecting a combination of said first image and said second image along said optical path toward said viewer.

16. The method of claim 12 wherein said first image is reflected at a 60° angle.

17. The method of claim 12 wherein said first image is reflected at a 45° angle.

18. A method for displaying an apparent three dimensional image comprising the steps of:

reflecting a first image along an optical path toward a viewer;

transmitting a second image along said optical path toward said viewer;

reflecting a third image along said optical path toward said viewer, thereby providing said viewer with a composite image of said first, second, and third images;

wherein said first image is made to appear a first distance away from said viewer, said second image is made to appear a second distance away from said viewer, and said third image is made to appear a third distance away from said viewer.

19. The method of claim 18 wherein said first distance and said second distance are equal to each other.

20. The method of claim 18 wherein said first distance and said second distance are not equal to each other.

21. The method of claim 18 further comprising the step of reflecting a combination of said first image and said second image along said optical path toward said viewer.

22. The method of claim 18 wherein said first image is reflected at a 60° angle.

23. The method of claim 18 wherein said first image is reflected at a 45° angle.

24. A method for displaying an apparent three dimensional image comprising the step of:

arranging a plurality of beam splitters so as to transmit and reflect a plurality of images such that said plurality of images are combined to form said apparent three dimensional image;

producing at least one of said plurality of images using visible light; and producing at least one of said plurality of images using ultraviolet light.

25. The method of claim 24 wherein said step of producing at least one of said plurality of images using visible light comprises the step of:

using an incandescent light source to produce visible light.

26. The method of claim 24 further comprising the step of:

making said plurality of images appear to move relative to one another such that said plurality of images appear to pass through one another.

27. A method for displaying an apparent three dimensional image comprising the steps of:

arranging a plurality of beam splitters so as to transmit and reflect a plurality of images such that said plurality of images are combined to form an apparent three dimensional image;

producing at least one of said plurality of images using visible light; and producing at least one of said plurality of images using ultraviolet light.

28. The method of claim 27 wherein said step of producing at least one of said plurality of images using visible light comprises the steps of:

using an incandescent light source to produce visible light.

* * * * *